United States Patent
Woo

(10) Patent No.: US 6,847,958 B2
(45) Date of Patent: Jan. 25, 2005

(54) METHOD OF MANAGING INDEX DATA IN MAIN MEMORY DATABASE

(75) Inventor: Seung Kyoon Woo, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 320 days.

(21) Appl. No.: 09/977,593

(22) Filed: Oct. 15, 2001

(65) Prior Publication Data

US 2002/0059185 A1 May 16, 2002

(30) Foreign Application Priority Data

Oct. 14, 2000 (KR) ........................................ 2000-60575

(51) Int. Cl.$^7$ ............................................. G06F 17/30
(52) U.S. Cl. ................ 707/1; 707/7; 707/2; 707/103 R; 707/104.1; 710/52; 370/536
(58) Field of Search ............................. 370/536; 707/2, 707/1, 103 R, 7, 104.1; 710/52

(56) References Cited

U.S. PATENT DOCUMENTS

| | | | |
|---|---|---|---|
| 5,806,058 A | * | 9/1998 | Mori et al. ..................... 707/2 |
| 6,349,308 B1 | * | 2/2002 | Whang et al. .......... 707/103 Z |
| 6,353,820 B1 | * | 3/2002 | Edwards et al. ................ 707/2 |
| 6,359,911 B1 | * | 3/2002 | Movshovich et al. ....... 370/536 |
| 6,434,170 B1 | * | 8/2002 | Movshovich et al. ....... 370/536 |
| 2003/0023786 A1 | * | 1/2003 | Craddock et al. ............. 710/52 |

FOREIGN PATENT DOCUMENTS

EP 0 760 501 A1 * 10/1997 ............. G06F/5/06

OTHER PUBLICATIONS

Liebeherr et al., Performance Comparison of Index Partitioning Schemes for Distributed Query Processing, IEEE, 1991, pp. 317–323.*

Liebeherr, The Effect of Index Partioning Schemes on the Performance of Distributed Query Processing, IEEE, 1993, pp. 510–522.*

Seshadri et al., Generalized Partial Indexes, IEEE, 1995, pp. 420–427.*

Claudio et al., Partial Indexing for Nonuniform Data Distributions in Relational DBMS's, IEEE, 1994, pp. 420–429.*

Utaka et al. New Structure of Multi–Mode Interference Photonic Switch with Partial Index Mofulation Regions, IEEE, pp. 469–470.*

IBM Technical Bulletin, Apr. 1993, Database Buffer Management for High Availability, vol. 36, Issue 4, pp. 295–298.*

* cited by examiner

Primary Examiner—Frantz Coby
(74) Attorney, Agent, or Firm—Lee, Hong, Degerman, Kang & Schmadeka

(57) ABSTRACT

Several methods of processing index data in an index node having a circular-queue type structure for adding, deleting, and searching a value in the index node are disclosed. According to the present invention, when a set of values stored in storage blocks is required to be shifted when adding, deleting, or searching a value in the index node, the circular-queue type structure formed by storage blocks in the index node enables the set of data be shifted in a manner that minimizes the number of the total value shifts. Therefore, the data processing time of the database system can be greatly reduced. The described methods can be applied to an Electronic Program Guide (EPG) database system and many others.

23 Claims, 4 Drawing Sheets

FIG. 4

```
L1     int Binary_Search_CQ(pnode,key)
       {
L2       i=pnode->head;
         j=pnode->tail;

if(j<i){
L3         ivalue=pnode->index[INDEXNODESIZE-1];
L4         if(ivalue>key)
             j=INDEXNODESIZE-2;
L5         else if(invalue<key)
             i=0;
L6         else/*invalue==key*/
             return INDEXNODESIZE-1;
         }
         while(1){
L7         if(i>j)
             break;
L8         k=(i+j)/2;
L9         ivalue=pnode->index[k];
L10        if(ivalue>key)
             j=k-1;
L11        else if (ivalue<key)
             i=k+1;
L12        else/*ivalue==key*/
             break;
         }
         return k;
       }
```

METHOD OF MANAGING INDEX DATA IN MAIN MEMORY DATABASE

This application claims the benefit of the Korean Application No. P2001-60575 filed on Oct. 17, 2001, which is hereby incorporated by reference.

BACKGROUND OF THE INVENTION

1. Field of the Invention

The present invention relates to a memory database, and more particularly, to a method of managing index data in a memory database, which efficiently stores and searches the index data by using a circular queue structure for indexing data in each node of a T-tree structure.

2. Discussion of the Related Art

In general, an indexing technique using a T-tree structure is often used for managing the index data in a main memory database. The main memory database uses a memory (i.e., D-RAM and S-RAM) instead of a disc for its storages. For example, a typical digital TV set uses the Electronic Program Guide (EPG) database system.

FIG. 1 illustrates a typical T-tree structure used for managing the index data in a main memory database system. As shown in FIG. 1, it includes many index nodes, each interconnected to its immediate upper and lower index nodes in a tree structure. Each index node has a limited space for storing its corresponding index information. Therefore, when a new set of information is added or one of existing information sets is deleted, each node creates a left lower node or a right lower node, and it transfers the corresponding information to the lower node created. The highest node in the tree structure shown in FIG. 1 is called as a root, and it transfers the information through a pointer, which is any one of a left lower node pointer and a right lower node pointer. The lower nodes corresponding to an upper node have the pointer information of the upper node.

FIG. 2 illustrates a typical construction of each node of the tree structure shown in FIG. 1 according to the related art. As it is shown in FIG. 2, an array technique is used to store the key value of each index node. Namely, the key values of an index node are initially stored in order. When an additional key value needs to be added, or when one of the stored key values needs to be deleted, all of the key values on the right of the key value being added or deleted must be rearranged, taking an extra processing time. For this reason, the systems, in which such additions and deletions of the key values frequently occurs, or the real-time main memory database systems have a lower data processing rate.

SUMMARY OF THE INVENTION

Accordingly, the present invention is directed to a method of managing index data in a memory database that substantially obviates one or more problems due to limitations and disadvantages of the related art.

An object of the present invention is to provide a method of managing index data in a memory database of a database system that is able to efficiently store and search the information by using a circular-queue technique in the T-tree structure of each node of the database system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of deleting a value from a series of index data stored in an index node of a database system includes the steps of: (a) receiving a first value required to be deleted from an ith storage block of the index node, i being any one of 1, 2, 3, . . . , N; (b) deleting the first value stored in the ith storage block; (c) shifting each of a first set of values stored in 1st, 2nd, 3rd, . . . , i−1th storage blocks to each of 2nd, 3rd, 4th, . . . , ith storage blocks if i<(N+1)/2; and shifting each of a second set of values stored in i+1th, i+2th, i+3th, . . . , Nth storage blocks to each of ith, i+1th, i+2th, . . . N−1th storage blocks if i>(N+1)/2 .

In another aspect of the present invention, a method of adding a value to a series of index data stored in an index node of a database system includes the steps of: (a) receiving a first value required to be added to an ith storage block of the index node, i being any one of 1, 2, 3, . . . , N; (b) adding an N+1th storage block between the 1st and Nth storage blocks; (c) shifting each of a first set of values stored in 1st, 2nd, 3rd, . . . , ith storage blocks to each of N+1th, 1st, 2nd, . . . , i−1th storage blocks if i<(N+1)/2; (d) shifting each of a second set of values stored in ith, i+1th, i+2th, . . . , Nth storage blocks to each of i+1th, i+2th, i+3th, . . . N+1th storage blocks if i>(N+1)/2; and (e) storing the first value received in the step (a) in the ith storage block.

In another aspect of the present invention, a method of searching for an input key value in an index node of a database system includes the steps of: (a) receiving the input key value; (b) initially setting a search range by setting block numbers of first and last values of the series of original values as i and j respectively, i and j representing starting and ending locations of the search range; (c) resetting the search range by resetting i and j depending on a comparison between the input key value and IVALUE_1 in order to make i be less than j if i is greater than j, the IVALUE_1 being a value stored in the Nth storage block; (d) narrowing the search range set in the step (b) or (c) by increasing i or decreasing j; and (e) repeating the step (d) until the input key value is found in the index node.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings;

FIG. 4 illustrates an algorithm for searching for a value in index information stored a circular-queue type node of a database system according to the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
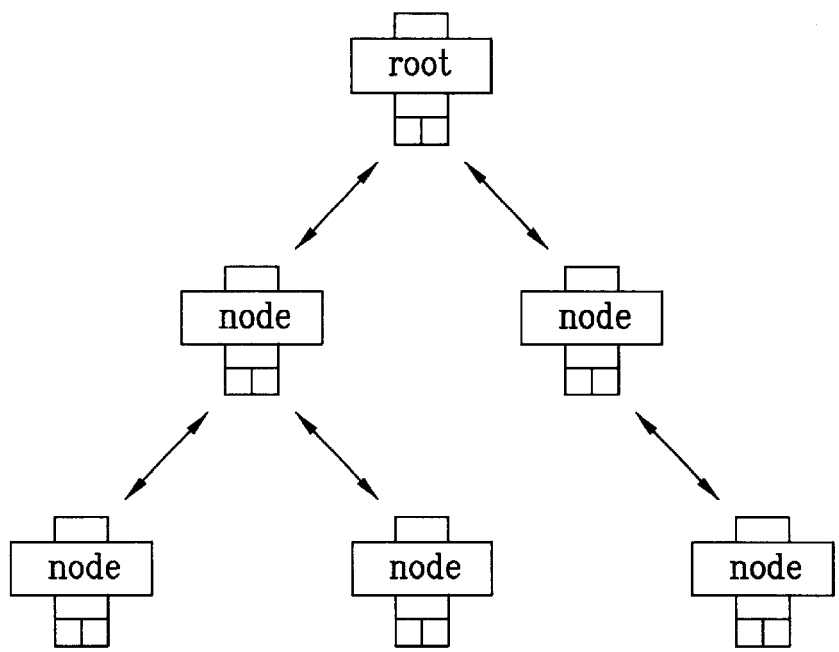
FIG. 1 illustrates a typical T-tree structure of the nodes in a database system according to the background art.
Figure 2:
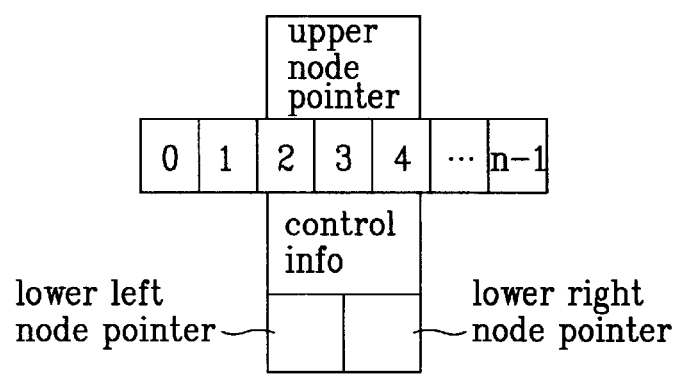
FIG. 2 illustrates an array type node of a main memory database system according to the background art.
Figure 3:
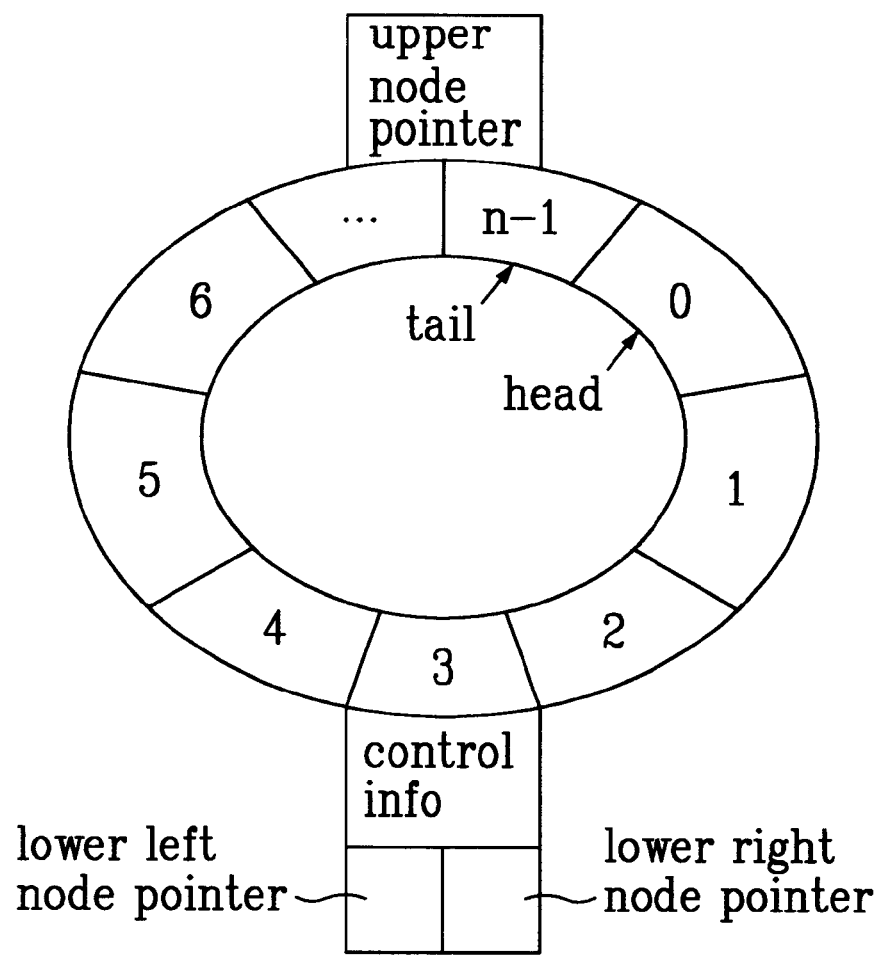
FIG. 3 illustrates a circular-queue type node of a main memory database system according to the present invention.

FIG.3 illustrates a construction of each of nodes having a T-tree structure in a main memory database system according to the present invention. The general configuration of each node shown in FIG. 3 is similar to FIG. 2, but conceptually, the index information sets are arranged in a circular-queue type structure, in which the key values stored in the first and last blocks are located next to each other.

In order to store a key value previously stored in the last block (n−1) of the storage space in the first block (0), the key value must move to the left side n−1 times in a node having the structure shown FIG. 2. However, the value can simply move once in the counterclockwise direction for a node having the structure shown in FIG.2 since the first and the last blocks (0 and n−1) are spatially located adjacent to each other.

The structure of each of the node having the T-tree type structure in a database system shown in FIG. 3 includes head and tail pointers to indicate the first and last blocks of the storage space. This means that the first and last blocks of the index information storage space are the blocks being indicated by the head and tail pointers, respectively.

Reference will now be made in detail to several examples showing how a key value can be added or deleted in each index node having a circular-queue type structure.

For example, when an additional key value is added between the values stored in blocks 2 and 3 in a node having an array structure shown in FIG. 2, a new block (n) is initially added next to the last block (n−1), and the additional key value will be stored in the block 3. Then each of the values previously stored in the blocks 3 to n−1 will be shifted to its next right block.

However, when an additional key value is added between the first and second key values stored in any two consecutive blocks in a node having a circular-queue structure, then a new block (n) will be added between the first and last blocks (0 and n−1), and the key value being added and all the existing key values will be arranged in a manner that minimizes the total number of necessary shifts. When the shifts of the key values are in the counterclockwise direction, the head pointer will point the block being added. If they are in the clockwise direction, the tail pointer will point the block being added.

After reviewing all the advantages of using a node having a circular-queue structure, a first example of the present invention can be generally explained. First of all, let's assume that it is desired to add a value to a series of index data stored in an index node of a database system. As shown earlier, the index node has 1st, 2nd, 3rd, . . . , Nth storage blocks in a circularqueue type structure, in which the 1st storage block is located next to the Nth storage block.

The first example of the present invention includes: receiving a first value required to be added to an ith storage block of the index node, i being any one of 1, 2, 3, . . . , N; adding an N+1th storage block between the 1st and Nth storage blocks; shifting each of a first set of values stored in 1st, 2nd, 3rd, . . . , ith storage blocks to each of N+1th, 1st, 2nd, . . . , i−1th storage blocks if i<(N+1)/2; shifting each of a second set of values stored in ith, i+1th, i+2th, . . . , Nth storage blocks to each of i+1th, i+2th, i+3th, . . . N+1th storage blocks if i>(N+1)/2; and storing the first value received in the step (a) in the ith storage block.

When i=(N+1)/2, any one of the first and second sets of values can be shifted as described. If all of the first set of values is shifted, a head pointer will point the N+1th storage block. Similarly, if all of the second set of values are shifted, then a tail pointer will point the N+1th.

In a second case where the key value stored in the block 0 is deleted, each of the key values on the right side must be shifted to its left block in the array structure. However, there is no value shift between the blocks in the node having the circular-queue structure. The head pointer will simply point the second block (1).

A method of deleting a value from a series of index data stored in an index node of a database system can now be explained in detail. As shown earlier, the index node has 1st, 2nd, 3rd, . . . , Nth storage blocks in a circular-queue type structure, in which the 1st storage block is located next to the Nth storage block. Then, the method of deleting a value according to the present invention includes: receiving a first value required to be deleted from an ith storage block of the index node, i being any one of 1, 2, 3, . . . , N; deleting the first value stored in the ith storage block; shifting each of a first set of values stored in 1st, 2nd, 3rd, . . . , −1th storage blocks to each of 2nd, 3rd, 4th, . . . , ith storage blocks if i<(N+1)/2; and shifting each of a second set of values stored in i+1th, i+2th, i+3th, . . . , Nth storage blocks to each of ith, i+1th, i+2th, . . . N−1th storage blocks if i>(N+1)/2.

In the method for deleting a value, if it turns out that i=(N+1)/2, then any one of the first and second sets of the values can be shifted as described. When all of the first set of values is shifted, a head pointer will point the 2nd storage block. On other hand, if all of the second set of values is shifted, a tail pointer will point the N−1th storage block.

As shown above, the data processing rate of a database system can be significantly improved by minimizing the number of key value shifts between storage blocks of the system using a circular-queue type index information storage structure.

FIG. 4 illustrates an algorithm for searching for index information in an index node of a database system using a circular-queue technique. As shown in FIG. 4, the first step of the algorithm is to receive a desired index node number and an input key value (L1).

Then, it sets the initial range for searching by initially setting the locations (block number) of the first and last values of a series of key values stored in the desired index node (L2) as i and j. The locations of the first and last values are indicated by head and tail pointers. In the step L2, i and j represent the range for searching, each representing an initial and final block number of the range for searching, respectively.

After i and j are initially set, the algorithm shown in FIG. 4 checks if j<i. In other words, it checks whether the location (block number) of the first value is greater than the location (block number) of the last value. If j>i, the algorithm skips the steps L3 to L6, and it will directly start from the step L7. However, if it is determined that j is less than i, then the algorithm compares ivalue, the value stored in the last block (n−1) of the desired node with the input key value. If ivalue is greater than the input key value, then j is reset to n−2 (L4). If ivalue is less than the input key value, i is set to 0 (L5)

since the key value is located between 0 and j. If ivalue is equal to the input key value, the algorithm will simply return n−1, the location of the last value (L6). As a result, when the search starting point i is located after the searching ending point j as shown in FIG. 5B, the steps L3 to L6 will reset the searching range by setting i or j after comparing the input key value with ivalue so that i is less than j.

Figure 5:
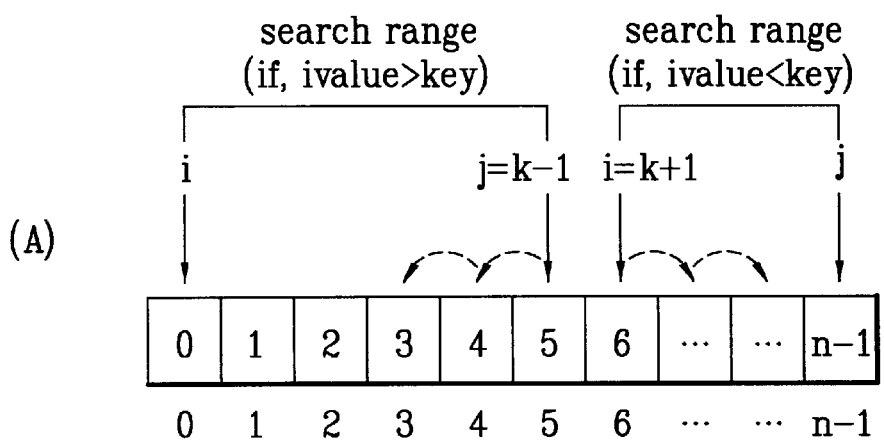
FIG. 5 illustrates examples showing how the searching range is reset based on the algorithm shown in FIG. 4.
Figure 5:
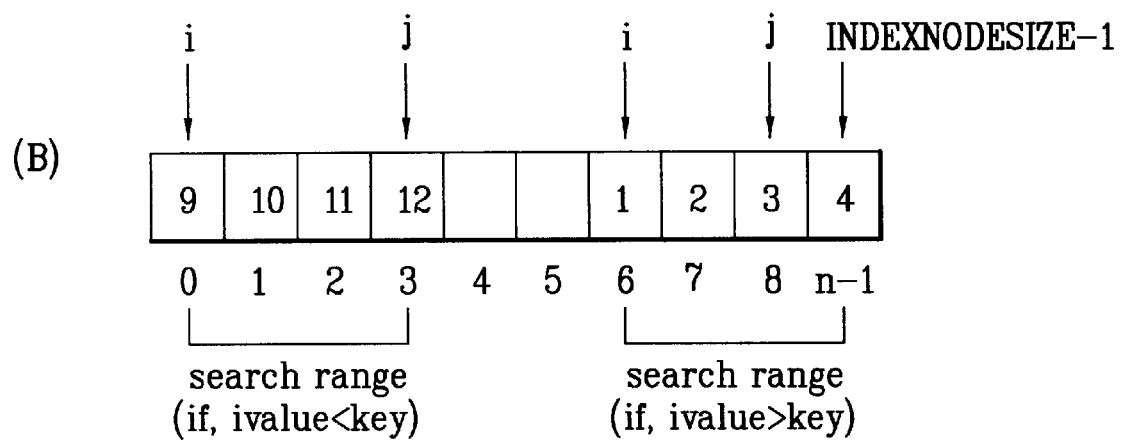

After setting i and j, i being less than or equal to j as shown in FIG. 5A, the algorithm finds the middle location (k) between i and j (L8). Then it compares the value stored in the middle location with the input key value. If it turns out that the key value is less than the middle value, j is reset to k−1 (L10). And if the key value is greater than the middle value, i is reset to k+1 (L11). As shown in FIG. 4, the steps L7 to L11 will be repeated until the algorithm finds the key value (index[k]=key). In addition, if i is greater than greater than j, it terminate the searching process (L7).

In conclusion, the data processing (storing/searching) rate of the database system is improved by using the circular-queue structure for storing index data in the index node of the database system. In addition, the described methods of adding, deleting, and searching a value in a node having N storage blocks in a database system can be applied to an Electronic Program Guide (EPG) database system used in a digital TV receiver.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A method of deleting a value from a series of index data stored in an index node of a database system, said index node having 1st, 2nd, 3rd, . . . , Nth storage blocks in a circular-queue type structure, in which said 1st storage block is located next to said Nth storage block, the method comprising the steps of:

(a) receiving a first value required to be deleted from an ith storage block of said index node, i being any one of 1, 2, 3, . . . , N;

(b) deleting said first value stored in said ith storage block;

(c) shifting each of a first set of values stored in 1st, 2nd, 3rd, . . . , i−1th storage blocks to each of 2nd, 3rd, 4th, . . . , ith storage blocks if i<(N+1)/2; and (d) shifting each of a second set of values stored in i+1th, i+2th, i+3th, . . . , Nth storage blocks to each of ith, i+1th, i+2th, . . . N−1th storage blocks if i>(N+1)/2.

2. The method of claim 1, further comprising a step of shifting each of said first set of values stored in 1st, 2nd, 3rd, . . . , i−1th storage blocks to each of 2nd, 3rd, 4th, . . . , ith storage blocks if i=(N+1)/2.

3. The method of claim 1, further comprising a step of shifting each of said second set of values stored in i+1th, i+2th, i+3th, . . . , Nth storage blocks to each of ith, i+1th, i+2th, . . . N−1th storage blocks if i=(N+1)/2.

4. The method of claim 1, wherein a head pointer points said 2nd storage block after all of said first set of values are shifted in the step (c), or a tail pointer points said N−1th storage block after all of said second set of values are shifted in the step (d).

5. The method of claim 1, wherein said database system is an Electronic Program Guide (EPG) database system used in a digital TV receiver.

6. A method of adding a value to a series of index data stored in an index node of a database system, said index node having 1st, 2nd, 3rd, . . . , Nth storage blocks in a circular-queue type structure, in which said 1st storage block is located next to said Nth storage block, the method comprising the steps of:

(a) receiving a first value required to be added to an ith storage block of said index node, i being any one of 1, 2, 3, . . . , N;

(b) adding an N+1th storage block between said 1st and Nth storage blocks;

(c) shifting each of a first set of values stored in 1st, 2nd, 3rd, . . . , ith storage blocks to each of N+1th, 1st, 2nd, . . . , i−1th storage blocks if i<(N+1)/2;

(d) shifting each of a second set of values stored in ith, i+1th, i+2th, . . . , Nth storage blocks to each of i+1th, i+2th, i+3th, . . . N+1th storage blocks if i>(N+1)/2; and (e) storing said first value received in the step (a) in said ith storage block.

7. The method of claim 6, further comprising a step of shifting each of said first set of values stored in 1st, 2nd, 3rd, . . . , ith storage blocks to each of N+1th, 1st, 2nd, . . . , i−1th storage blocks if i=(N+1)/2 .

8. The method of claim 6, further comprising a step of shifting each of said second set of values stored in ith, i+1th, i+2th, . . . , Nth storage blocks to each of i+1th, i+2th, i+3th, . . . N+1th storage blocks if i=(N+1)/2.

9. The method of claim 6, wherein a head pointer points said N+1th storage block after all of said first set of values are shifted in the step (c), or a tail pointer points said N+1th storage block after all of said second set of values are shifted in the step (d).

10. The method of claim 6, wherein said database system is an Electronic Program Guide (EPG) database system used in a digital TV receiver.

11. A method of searching for an input key value in an index node of a database system, said index node having 1st, 2nd, 3rd, . . . ,Nth storage blocks storing a series of original values in a T-tree type structure, the method comprising the steps of:

(a) locating said $1^{st}$ storage block next to said Nth storage block so that the T-tree type structure is converted into a circular-queue type structure;

(b) receiving said input key value;

(c) initially setting a search range by setting block numbers of first and last values of said series of original values as i and j respectively, i and j representing starting and ending locations of said search range;

(d) resetting said search range by resetting i and j depending on a comparison between said input key value and IVALUE_1 in order to make i be less than j if i is greater than j, said IVALUE_1 being a value stored in said Nth storage block;

(e) narrowing said search range set in the step (c) or (d) by increasing i or decreasing j; and (f) repeating the step (e) until said input key value is found in said index node.

12. The method of claim 11, wherein storage blocks storing said first and last values of said series are indicated by head and tail pointers, respectively.

13. The method of claim 11, wherein the step (d) comprises:

(d1) resetting j to N−2 if said IVALUE_1 is greater than said input key value;

(d2) resetting i to zero if said IVALUE_1 is less than said input key value; and (d3) returning N−1 and exiting if said IVALUE_1 is equal to said input key value.

14. The method of claim 11, wherein the step (e) comprises:

(e1) setting k to (i+j)/2;

(e2) setting IVALUE_2 to a value stored in a middle storage block having its block number equal to k;

(e3) resetting j to k_1 if said IVALUE_2 is greater than said input key value; and (e4) resetting i to k+1 if said IVALUE_2 is less than said input key value.

15. The method of claim 14, wherein the step (e) further comprises a step (e5) of exiting if i is greater than j.

16. A method of detecting a value from a series of index data stored in an index node of a database system, said index node having 1st, 2nd, 3rd, ..., Nth storage blocks in a T-tree type structure, the method comprising the steps of:

(a) locating said $1^{st}$ storage block next to said Nth storage block so that the T-tree type structure is converted into a circular-queue type structure;

(b) receiving a first value required to be deleted from an ith storage block of said index node, i being any one of 1, 2, 3, ...,N;

(c) deleting said first value stored in said ith storage block;

(d) shifting each of first set of values stored in 1st, 2nd, 3rd, ..., i−1th storage blocks to each of 2nd, 3rd, 4th, ..., ith storage blocks if i<(N+1)/2; and (e) shifting each of a second set of values stored in i+1th, i+2th, i+3th, ..., Nth storage blocks to each of ith, i+1th, i+2th, ..., N−1th storage blocks if i>(N+1)/2.

17. The method of claim 16, wherein the circular-queue type structure comprises a head pointer indicating a first storage block, and a tail point indicating a last storage block.

18. A method of adding a value to a series of index data stored in an index node of a database system, said index node having 1st, 2nd, 3rd, ..., Nth storage blocks in a T-tree type structure, the method comprising the steps of:

(a) locating said 1st storage block next to said Nth storage block so that the T-tree type structure is converted into a circular-queue type structure;

(b) receiving a first value required to be added to an ith storage block of said index node, i being any one of 1, 2, 3, ...,N;

(c) adding an N+1th storage block between said 1st and Nth storage blocks;

(d) shifting each of first set of values stored in 1st, 2nd, 3rd, ..., ith storage blocks to each of N+1th, 1st, 2nd, ..., i−1th storage blocks if i<(N+1)/2;

(e) shifting each of a second set of values stored in ith, i+1th, i+2th, ..., Nth storage blocks to each of i+1th, i+2th, i+3th, ..., N+1th storage blocks if i>(N+1)/2; and (f) storing said first value received in the step (a) in said ith storage block.

19. The method of claim 18, wherein the circular-queue type structure comprises a head pointer indicating a first storage block, and a tail point indicating a last storage block.

20. A method of updating a database having N nodes in an indexed array comprising at least a $node_1$, wherein 0<i<N, and wherein each $node_i$ stores a value, and each $node_i$ is located between a $node_{i-1}$ and a $node_{i+1}$, the method comprising:

deleting the value stored in $node_i$;

shifting each of the values stored in nodes 1 through i−1 to nodes 2 through i respectively, if i>(N+1)/2; and shifting each of the values stored in nodes i+1 through N to nodes i through N−1 respectively, if i<(N+1)/2.

21. The method of claim 20, wherein $node_N$ is located between $node_{N-1}$ and $Node_1$ in a circular array structure.

22. A method of updating a database having N nodes in an indexed array comprising at least a $node_i$, wherein 0<i<N, and wherein each $node_i$ stores a value, and each $node_i$ is located between a $node_{i-1}$ and a $node_{i+1}$, the method comprising:

receiving a new value to be stored in a $node_i$; instantiating a $node_{N+1}$;

shifting the value stored in $node_1$ to $node_{N+1}$, if i<(N+1)/2;

shifting each of the values stored in nodes 2 through i to nodes 1 through i−1 respectively, if i<(N+1)/2;

shifting each of the values stored in nodes i through N to nodes i+1 to N+1 respectively, if i>(N+1)/2; and storing said first value in the $node_i$.

23. The method of claim 22, wherein $node_N$ is located between $node_{N-1}$ and $Node_1$ in a circular array structure.

* * * * *